(12) United States Patent
Sakamoto

(10) Patent No.: US 11,476,497 B2
(45) Date of Patent: Oct. 18, 2022

(54) SULFIDE SOLID-STATE BATTERY

(71) Applicant: TOYOTA JIDOSHA KABUSHIKI KAISHA, Toyota (JP)

(72) Inventor: Ryuto Sakamoto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 108 days.

(21) Appl. No.: 16/410,067

(22) Filed: May 13, 2019

(65) Prior Publication Data

US 2019/0372156 A1   Dec. 5, 2019

(30) Foreign Application Priority Data

Jun. 1, 2018   (JP) .............................. JP2018-106145

(51) Int. Cl.
| | |
|---|---|
| *H01M 10/0562* | (2010.01) |
| *H01M 4/62* | (2006.01) |
| *H01M 4/36* | (2006.01) |
| *H01M 4/02* | (2006.01) |

(52) U.S. Cl.
CPC ....... *H01M 10/0562* (2013.01); *H01M 4/364* (2013.01); *H01M 4/62* (2013.01); *H01M 2004/027* (2013.01); *H01M 2300/0068* (2013.01); *H01M 2300/0071* (2013.01); *H01M 2300/0088* (2013.01)

(58) Field of Classification Search
None
See application file for complete search history.

(56) References Cited

U.S. PATENT DOCUMENTS

2017/0125842 A1*  5/2017  Meguro ............ H01M 10/0525
2017/0162902 A1*  6/2017  Ohta ................. H01M 10/0562

FOREIGN PATENT DOCUMENTS

| JP | 2015-069848 A | | 4/2015 | |
| JP | 2015-153628 | * | 8/2015 | .......... H01M 10/052 |
| JP | 2015-153628 A | | 8/2015 | |
| JP | 2017-107665 A | | 6/2017 | |
| JP | 2017107665 | * | 6/2017 | ............... H01B 1/06 |

* cited by examiner

*Primary Examiner* — Jonathan Crepeau
*Assistant Examiner* — Angela J Martin
(74) *Attorney, Agent, or Firm* — Sughrue Mion, PLLC

(57) ABSTRACT

According to an aspect of the present invention, provided is a sulfide solid-state battery including a negative electrode current collector that contains copper, and a negative electrode mixture layer that contains a negative electrode active material, a sulfide solid electrolyte material, and an oxide solid electrolyte material. Assuming that the negative electrode mixture layer is virtually divided into two portions in a thickness direction, the upper layer portion contains a larger amount of the sulfide solid electrolyte material than the lower layer portion, and the lower layer portion contains a larger amount of the oxide solid electrolyte material than the upper layer portion.

4 Claims, 3 Drawing Sheets

SULFIDE SOLID-STATE BATTERY

CROSS REFERENCE TO RELATED APPLICATION

This application claims the benefit of priority to Japanese Patent Application No. 2018-106145 filed on Jun. 1, 2018. The entire contents of this application are hereby incorporated herein by reference.

BACKGROUND OF THE DISCLOSURE

1. Field

The present invention relates to a sulfide solid-state battery.

2. Background

Under circumstances where an improvement in the reliability of a secondary battery and a reduction in cost have been demanded in recent years, development of an all-solid-state battery having a solid electrolyte layer is accelerated (see, e.g., Japanese Patent Application Publication No. 2015-069848 and Japanese Patent Application Publication No. 2017-107665). As an example of the all-solid-state battery, a sulfide solid-state battery that includes a positive electrode, a negative electrode, and a sulfide solid electrolyte layer interposed between the positive electrode and the negative electrode has been known. The negative electrode of the sulfide solid-state battery includes, e.g., a negative electrode current collector made of copper (Cu), and a negative electrode mixture layer that contains a negative electrode active material and a sulfide solid electrolyte material and is disposed on the negative electrode current collector.

SUMMARY

When a sulfide solid-state battery having the above configuration is exposed to, e.g., a high temperature environment or is brought into an over-discharge state and the potential of a negative electrode is increased, Cu can be eluted from a negative electrode current collector and enter a negative electrode mixture layer. Subsequently, when Cu reacts with sulfur (S) of a sulfide solid electrolyte material in the negative electrode mixture layer, copper sulfide (e.g., $Cu_2S$, $CuS$) may be generated. When the copper sulfide gradually grows and reaches a sulfide solid electrolyte layer, a leak current may be generated, which may lead to reduction of battery capacity, or otherwise, a positive electrode and the negative electrode may be short-circuited.

Thus, the present inventors have conceived of causing the negative electrode mixture layer to contain an oxide solid electrolyte material having high chemical stability instead of the sulfide solid electrolyte material from the viewpoint of preventing the generation of copper sulfide. However, when the sulfide solid electrolyte material in the negative electrode mixture layer is simply replaced with the oxide solid electrolyte material, a problem arises in that resistance in the negative electrode mixture layer increases, which may deteriorate high-rate cycle characteristics. The sulfide solid-state battery, which may be used in an application that requires repetition of rapid charge and discharge (e.g., a vehicle-mounted battery), is required not only to inhibit the generation and growth of copper sulfide in the negative electrode but also to achieve excellent high-rate cycle characteristics.

The present invention has been made in view of these circumstances, and an object thereof is to provide a sulfide solid-state battery that reduces generation of copper sulfide in a negative electrode and exhibits excellent high-rate cycle characteristics.

According to an aspect of the present invention, provided is a sulfide solid-state battery including: a negative electrode current collector that contains copper; a negative electrode mixture layer that contains a negative electrode active material, a sulfide solid electrolyte material, and an oxide solid electrolyte material and is disposed on the negative electrode current collector; a positive electrode mixture layer that contains a positive electrode active material; and a sulfide solid electrolyte layer that contains the sulfide solid electrolyte material and is disposed between the negative electrode mixture layer and the positive electrode mixture layer. In the sulfide solid-state battery, assuming that the negative electrode mixture layer is virtually divided into two portions in a thickness direction, then a portion on a side of the negative electrode mixture layer relatively close to the negative electrode current collector is taken as a lower layer portion, and a portion on a surface side of the negative electrode mixture layer relatively far from the negative electrode current collector is taken as an upper layer portion, the upper layer portion contains a larger amount of the sulfide solid electrolyte material than the lower layer portion, and the lower layer portion contains a larger amount of the oxide solid electrolyte material than the upper layer portion.

In the sulfide solid-state battery, the lower layer portion of the negative electrode mixture layer (a portion on the side of the negative electrode mixture layer close to the negative electrode current collector) contains a larger amount of the oxide solid electrolyte material, and the upper layer portion of the negative electrode mixture layer (a portion on the side of the negative electrode mixture layer far from the negative electrode current collector) contains a larger amount of the sulfide solid electrolyte material. That is, in the sulfide solid-state battery, contact between the negative electrode current collector and the sulfide solid electrolyte material is reduced by the oxide solid electrolyte material. Thus, it is possible to inhibit reaction between the negative electrode current collector and the sulfide solid electrolyte material to reduce generation and growth of copper sulfide. As a result, it is possible to prevent a short circuit between a positive electrode and a negative electrode. In addition, in the sulfide solid-state battery, it is possible to reduce resistance in the negative electrode mixture layer to a low level, and maintain high battery capacity even after repetition of high-rate charge and discharge, for example.

Note that Japanese Patent Application Publication No. 2015-069848 discloses a technique for coating a conductive material such as Ni, Cr, or carbon on the surface of a negative electrode current collector (Cu foil) from the viewpoint of inhibiting the generation of copper sulfide. In contrast to this, in the sulfide solid-state battery, the step of coating the conductive material may be omitted.

In an aspect of the present invention, the sulfide solid-state battery has a ratio (Ms/Mo) of a content Ms of the sulfide solid electrolyte material to a content Mo of the oxide solid electrolyte material in the negative electrode mixture layer of not less than 1.84. As a result of this feature, it is possible to suitably reduce the resistance in the negative electrode mixture layer and to further improve high-rate cycle characteristics.

In an aspect of the present invention, the sulfide solid-state battery has a ratio (Ms/Mo) of a content Ms of the sulfide solid electrolyte material to a content Mo of the oxide solid electrolyte material in the negative electrode mixture layer of not more than 6.53. As a result of this feature, it is possible to reduce direct contact between the negative electrode current collector and the sulfide solid electrolyte material at a higher level.

In an aspect of the present invention, the sulfide solid-state battery has a ratio (Do/Ds) of an average particle diameter Do of the oxide solid electrolyte material to an average particle diameter Ds of the sulfide solid electrolyte material in the negative electrode mixture layer of not more than 4. As a result of this feature, for example, it is possible to suitably reduce the resistance in the negative electrode mixture layer and interface resistance between the negative electrode mixture layer and the negative electrode current collector and further improve high-rate cycle characteristics.

In an aspect of the present invention, the sulfide solid-state battery has a ratio (Do/Ds) of an average particle diameter Do of the oxide solid electrolyte material to an average particle diameter Ds of the sulfide solid electrolyte material in the negative electrode mixture layer of not less than 2. As a result of this feature, it is possible to more easily obtain the negative electrode mixture layer in which the oxide solid electrolyte material is unevenly distributed to the lower layer portion and the sulfide solid electrolyte material is unevenly distributed to the upper layer portion.

In an aspect of the present invention, the negative electrode mixture layer has a single-layer structure. As a result of this feature, the coating step of the negative electrode mixture layer needs to be performed only once, and it is possible to improve productivity and reduce manufacturing cost as compared with the case where the negative electrode mixture layer has a multilayer structure. In addition, it is possible to reduce the resistance in the negative electrode mixture layer and further improve high-rate cycle characteristics.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
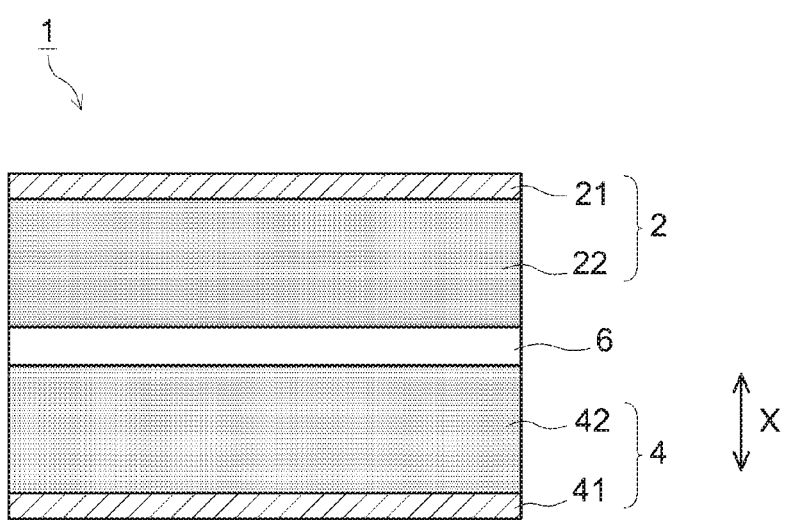
FIG. 1 is a schematic cross-sectional view of a sulfide solid-state battery according to an embodiment of the present invention.

Hereinbelow, several embodiments of a sulfide solid-state battery disclosed herein will be described. Note that, needless to say, the embodiments described herein are not intended to limit the present invention. Apart from matters that are specifically mentioned in the present specification, other matters that are necessary for implementing the present invention (e.g., battery constituents and typical manufacturing processes of the battery that do not characterize the present invention) can be understood as design matters of those skilled in the art based on conventional techniques in the field. The sulfide solid-state battery disclosed herein can be realized based on contents disclosed in the present specification and common general technical knowledge in the field. Note that, in the case where a numerical range is described as A to B (each of A and B is any numerical value) in the present specification, A to B means not less than A and not more than B.

In the following drawings, members and portions that have the same functions are designated by the same reference numerals and, in some cases, the duplicate description thereof may be omitted or simplified. In addition, a reference mark X in the drawings means a stacking direction of a positive electrode and a negative electrode, and also means a thickness direction of each layer. However, this is a direction for the convenience of description, and does not limit the installation form of the sulfide solid-state battery.

FIG. 1 is a schematic cross-sectional view of a sulfide solid-state battery 1. As shown in FIG. 1, the sulfide solid-state battery 1 includes a positive electrode 2, a negative electrode 4, and a sulfide solid electrolyte layer 6. In a stacking direction X, the sulfide solid electrolyte layer 6 is disposed between the positive electrode 2 and the negative electrode 4. The positive electrode 2 and the sulfide solid electrolyte layer 6 are bonded together by interface bonding. The negative electrode 4 and the sulfide solid electrolyte layer 6 are bonded together by interface bonding. The positive electrode 2, the negative electrode 4, and the sulfide solid electrolyte layer 6 are physically integrated with each other. The sulfide solid-state battery 1 is typically a chargeable and dischargeable secondary battery such as, e.g., a lithium ion secondary battery, a lithium ion capacitor, or an electric double-layer capacitor. Hereinbelow, the individual constituents swill be described one by one.

As shown in FIG. 1, the positive electrode 2 includes a positive electrode current collector 21, and a positive electrode mixture layer 22 fixed to one of the surfaces of the positive electrode current collector 21. The positive electrode current collector 21 is a conductive member. Although not shown, the positive electrode current collector 21 is electrically connected to a positive electrode terminal for external connection. Although not particularly limited, the positive electrode current collector 21 is made of metal such as, e.g., Al, Ti, or stainless steel (SUS) that is excellent in conductivity. Note that, in the present embodiment, although the positive electrode 2 is constituted by the positive electrode current collector 21 and the positive electrode mixture layer 22 fixed to one of the surfaces of the positive electrode current collector 21, the positive electrode 2 may not have the positive electrode current collector 21. The positive electrode mixture layer 22 may also be fixed to each of the surfaces of the positive electrode current collector 21.

The positive electrode mixture layer 22 contains at least a positive electrode active material. The positive electrode active material is the material that can reversibly occlude and release carriers (e.g., lithium ions). Although not particularly limited, an example of the positive electrode active material includes a metal oxide containing one or two or more metallic elements and an oxygen element. The metal oxide may be a compound containing a lithium element, one or two or more transition metal elements, and the oxygen element. A preferable example of the metal oxide includes a lithium/transition metal composite oxide such as a lithium/ nickel-containing composite oxide, a lithium/cobalt-containing composite oxide, a lithium/nickel/cobalt-containing composite oxide, a lithium/manganese-containing composite oxide, or a lithium/nickel/cobalt/manganese-containing composite oxide.

In addition to the positive electrode active material, the positive electrode mixture layer 22 may contain ingredients other than the positive electrode active material such as, e.g., a solid electrolyte material, a binder, a conductive material, and various additives on an as needed basis. Examples of the solid electrolyte material include a sulfide solid electrolyte material, an oxide solid electrolyte material, a nitride solid electrolyte material, and a halide solid electrolyte material. More specifically, an example of the solid electrolyte material includes a sulfide solid electrolyte material 42s (see FIG. 2) that will be described later as a constituent material of a negative electrode mixture layer 42. The positive electrode mixture layer 22 may contain only the sulfide solid electrolyte material as the solid electrolyte material without containing, e.g., the oxide solid electrolyte material or the like. Examples of the binder include halogenated vinyl resins such as polyvinylidene fluoride (PVdF) and a copolymer of polyvinylidene fluoride and hexafluoropropylene (PVdF-HFP), and rubbers such as an acrylate-butadiene rubber (ABR), a styrene-butadiene rubber (SBR), and an acrylonitrile-butadiene rubber (NBR). Examples of the conductive material include carbon materials such as vapor deposition carbon fiber and carbon black.

As shown in FIG. 1, the negative electrode 4 includes a negative electrode current collector 41, and the negative electrode mixture layer 42 fixed to one of the surfaces of the negative electrode current collector 41. The negative electrode mixture layer 42 is formed directly on the surface of the negative electrode current collector 41. The negative electrode current collector 41 is a conductive member. Although not shown, the negative electrode current collector 41 is electrically connected to a negative electrode terminal for external connection. The negative electrode current collector 41 contains a copper (Cu) ingredient. The negative electrode current collector 41 may be made of metal containing Cu that is excellent in conductivity such as, e.g., copper or a copper alloy containing copper. In an aspect, in the case where Cu is exposed on part of the surface or on the entire surface of the negative electrode current collector 41, the problem of sulfide copper generation described above occurs especially easily. In another aspect, in the case where the content of copper in the negative electrode current collector 41 is high, for example, in the case where the Cu ingredient occupies 50 percent by mass or more of the entire negative electrode current collector 41, or further occupies 80 percent by mass or more thereof such as, e.g., the case where the negative electrode current collector 41 is made of copper, the problem of copper sulfide generation occurs especially easily. Consequently, in such a case, it is especially preferable to use the technique disclosed herein.

Figure 2:
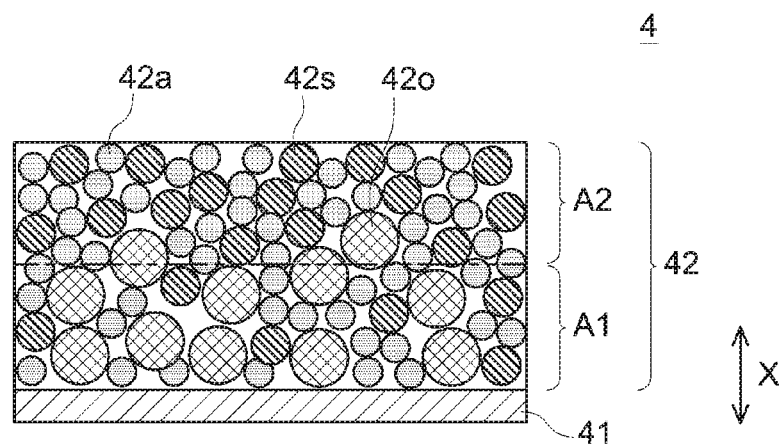
FIG. 2 is a partial cross-sectional view of a negative electrode of FIG. 1.

The negative electrode mixture layer 42 has a single-layer structure. In other words, the negative electrode mixture layer 42 does not have an interface at which constituents discontinuously change at some midpoint in the thickness direction X. The negative electrode mixture layer 42 does not have the interface, and resistance in the negative electrode mixture layer 42 is thereby reduced relatively. The negative electrode mixture layer 42 is formed continuously in the thickness direction X by, e.g., performing a coating step once. Although not particularly limited, the thickness of the negative electrode mixture layer 42 may be approximately 1 to 1000 μm, typically 10 to 500 μm, and, e.g., 50 to 200 μm. Note that, in the present embodiment, the negative electrode mixture layer 42 is fixed to only one of the surfaces of the negative electrode current collector 41, but the negative electrode mixture layer 42 may be fixed to each of the surfaces of the negative electrode current collector 41. FIG. 2 is a partial cross-sectional view of the negative electrode 4. As shown in FIG. 2, the negative electrode mixture layer 42 contains at least a negative electrode active material 42a, a sulfide solid electrolyte material 42s, and an oxide solid electrolyte material 42o.

The negative electrode active material 42a is the material that can reversibly occlude and release carriers (e.g., lithium ions). Although not particularly limited, examples of the negative electrode active material 42a include metal materials such as Al, Si, Ti, In, and Sn, metal compounds containing the above metallic elements, a metal oxide, a Li metal compound, a Li metal oxide, and carbon materials such as hard carbon, graphite, and boron-added carbon. An example of the Li metal oxide includes a lithium/transition metal composite oxide such as lithium titanate. The negative electrode active material may be, e.g., a Si-based material having the content of silicon (Si) of about 50 percent by mass or more. The content of Si in the entire negative electrode active material may be, e.g., 80 percent by mass or more. The Si-based material may be at least one of Si, a Si alloy, a Si compound, and a Si mixture.

In the present embodiment, the negative electrode active material 42a is granular. Although not particularly limited, the average particle diameter of the negative electrode active material 42a may be approximately 0.01 to 10 μm, typically 0.1 to 5 μm, and, e.g., 0.5 to 3 μm. By setting the average particle diameter to a predetermined value or more, it is possible to reduce interface resistance between the particles of the negative electrode active material 42a. By setting the average particle diameter to a predetermined value or less, it is possible to improve identity as the negative electrode mixture layer 42. Note that the "average particle diameter" in the present specification denotes the particle diameter corresponding to cumulative 50% from the smaller-diameter side in a volume particle size distribution obtained by particle size distribution measurement based on a laser diffraction scattering method.

The sulfide solid electrolyte material 42s has ion conductivity higher than that of the oxide solid electrolyte material 42o. The sulfide solid electrolyte material 42s forms the interface with the negative electrode active material 42a easily as compared with the oxide solid electrolyte material 42o. Accordingly, the sulfide solid electrolyte material 42s has the function of reducing the resistance in the negative electrode mixture layer 42 to a level lower than that in the case where only the oxide solid electrolyte material 42o is used. The ion conductivity (e.g., Li ion conductivity) of the sulfide solid electrolyte material 42s may be preferably, e.g., $1 \times 10^{-5}$ S/cm or more, and further $1 \times 10^{-4}$ S/cm or more at room temperature (25° C.). The sulfide solid electrolyte material 42s may be glassy (amorphous), be formed of crystalized glass, or be crystalline.

Although not particularly limited, examples of the sulfide solid electrolyte material 42s include sulfide materials such as $Li_2S$—$P_2S_5$-based materials, $Li_2S$—$GeS_2$-based materials, $Li_2S$—$GeS_2$—$P_2S_5$-based materials, $Li_2S$—$SiS_2$-based materials, $Li_2S$—$B_2S_3$-based materials, and $Li_3PO_4$—$P_2S_5$-based materials. Specific examples thereof include $Li_7P_3S_{11}$ ($Li_2S:P_2S_5$=70:30 (molar ratio), LPS), $Li_{3.25}P_{0.95}S_4$ ($Li_2S:P_2S_5$=75:25 (molar ratio), LPG), and $Li_{10}GeP_2S_{12}$ (LGPS). In addition, a halogen-added sulfide material obtained by adding a halogen element to the above sulfide material is also suitable. An example of the halogen-added sulfide material includes a compound represented by the following formula: $Li_{7-x}PS_{6-x}A_x$ (wherein x satisfies $0.1 \leq x \leq 2$, e.g., $0.2 \leq x \leq 1.8$, and A is at least one of halogen elements, e.g., at least one of Cl, Br, and I).

The oxide solid electrolyte material 42o has chemical stability higher than that of the sulfide solid electrolyte material 42s. Accordingly, the oxide solid electrolyte material 42o has the function of preventing reaction between the Cu ingredient of the negative electrode current collector 41 and the S ingredient of the sulfide solid electrolyte material. The oxide solid electrolyte material 42o may be glassy (amorphous), be formed of crystalized glass, or be crystalline. The oxide solid electrolyte material 42o may be an oxide having, e.g., a NASICON structure, a garnet structure, or a perovskite structure.

Although not particularly limited, examples of the oxide solid electrolyte material 42o include a lithium/lanthanum/zirconium-containing composite oxide (LLZO), an Al-doped-LLZO, a lithium/lanthanum/titanium-containing composite oxide (LLTO), an Al-doped-LLTO, and a lithium phosphate oxynitride (LIPON). An example thereof includes a composite oxide represented by the following formula: $(Li_{7-3\alpha-\beta}, Al_\alpha)(La_3)(Zr_{2-\beta}M_\beta)O_{12}$ (wherein $\alpha$ is any number satisfying $0 \leq \alpha \leq 0.22$ and $\beta$ is any number satisfying $0 \leq \beta \leq 2$. When $0 < \beta$ is satisfied, M is at least one of Nb and Ta).

In the present embodiment, the sulfide solid electrolyte material 42s and the oxide solid electrolyte material 42o are granular. Although not particularly limited, each of the average particle diameters of the sulfide solid electrolyte material 42s and the oxide solid electrolyte material 42o may be not less than 0.01 µm, 0.05 µm 0.1 µm, or 0.5 µm, and be not more than 10 µm, 5 µm, 3 µm, or 2 µm. The average particle diameter Ds of the sulfide solid electrolyte material 42s may be smaller than the average particle diameter of the negative electrode active material 42a. The average particle diameter Do of the oxide solid electrolyte material 42o may be smaller than the average particle diameter of the negative electrode active material 42a.

In an aspect, the average particle diameter Ds of the sulfide solid electrolyte material 42s and the average particle diameter Do of the oxide solid electrolyte material 42o are different from each other. The average particle diameter Do of the oxide solid electrolyte material 42o may be not less than the average particle diameter Ds of the sulfide solid electrolyte material 42s, e.g., 1.5 or more times the average particle diameter Ds thereof, and preferably 2 or more times the average particle diameter Ds thereof, and may be approximately 10 or less times the average particle diameter Ds thereof, typically 5 or less times the average particle diameter Ds thereof, preferably 4 or less times the average particle diameter Ds thereof, and further 3 or less times the average particle diameter Ds thereof. In other words, the ratio (Do/Ds) of the average particle diameter Do of the oxide solid electrolyte material 42o to the average particle diameter Ds of the sulfide solid electrolyte material 42s preferably satisfies the following formula: $1 < (Do/Ds) \leq 10$, and further preferably satisfies the following formula $1.5 \leq (Do/Ds) \leq 5$. In an example, the ratio may satisfy the following formula: $2 \leq (Do/Ds) \leq 4$, and may further satisfy the following formula: $2 \leq (Do/Ds) \leq 3$. With this, it is possible to easily implement the negative electrode mixture layer 42 in the present embodiment. In addition, it is possible to exercise the effect of the technique disclosed herein at a high level.

In addition to the negative electrode active material 42a, the sulfide solid electrolyte material 42s, and the oxide solid electrolyte material 42o, the negative electrode mixture layer 42 may contain ingredients other than those mentioned above such as, e.g., the binder, the conductive material, an inorganic filler, and various additives on an as needed basis. Examples of the binder include halogenated vinyl resins such as polyvinylidene fluoride (PVdF) and the copolymer of polyvinylidene fluoride and hexafluoropropylene (PVdF-HFP), and rubbers such as the acrylate-butadiene rubber (ABR), the styrene-butadiene rubber (SBR), and the acrylonitrile-butadiene rubber (NBR). Examples of the conductive material include carbon materials such as the vapor deposition carbon fiber and the carbon black. Examples of the inorganic filler include metal powders of Ti, Cr, Fe, Ni, Zn, and the stainless steel (SUS).

Although not particularly limited, when the entire solid portion of the negative electrode mixture layer 42 is 100 percent by mass, the content of the negative electrode active material 42a may be approximately 30 to 90 percent by mass, typically 40 to 80 percent by mass, e.g., 45 to 70 percent by mass, and further 50 to 60 percent by mass. When the entire solid portion of the negative electrode mixture layer 42 is 100 percent by mass, the sum (Ms+Mo) of the content Ms of the sulfide solid electrolyte material 42s and the content Mo of the oxide solid electrolyte material 42o may be approximately 10 to 70 percent by mass, typically 20 to 60 percent by mass, e.g., 30 to 65 percent by mass, and further 40 to 50 percent by mass. From the viewpoint of high energy density, Ms+Mo is preferably lower than the content of the negative electrode active material 42a. By setting Ms+Mo such that Ms+Mo falls within the above range, it is possible to achieve, e.g., both of high energy density and excellent high-rate cycle characteristics at a high level.

When the entire solid portion of the negative electrode mixture layer 42 is 100 percent by mass, the content Ms of the sulfide solid electrolyte material 42s may be approximately 10 to 60 percent by mass, typically 20 to 50 percent by mass, e.g., 25 to 45 percent by mass, and further 30 to 40 percent by mass. By setting Ms to a predetermined value or more, it is possible to improve the ion conductivity of the negative electrode mixture layer 42 and reduce the resistance in the negative electrode mixture layer 42. The content Mo of the oxide solid electrolyte material 42o may be approximately 1 to 40 percent by mass, typically 2 to 30 percent by mass, e.g., 5 to 24 percent by mass, and further 6 to 18 percent by mass. By setting Mo to a predetermined value or more, it is possible to exercise the effect of the technique disclosed herein at a high level. By setting Mo to a predetermined value or less, it is possible to reduce the resistance in the negative electrode mixture layer 42.

In an aspect, the content Mo of the oxide solid electrolyte material 42o is lower than the content Ms of the sulfide solid electrolyte material 42s. That is, Mo<Ms is satisfied. The ratio (Ms/Mo) of the content Ms of the sulfide solid electrolyte material 42s to the content Mo of the oxide solid electrolyte material 42o preferably satisfies, e.g., the following formula: $1 < (Ms/Mo) \leq 15$, and more preferably satisfies the following formula: $1.25 \leq (Ms/Mo) \leq 10$. In an example, the ratio thereof may satisfy the following formula: $1.84 \leq (Ms/Mo) \leq 6.53$, and may further satisfy the following formula: $3.02 \leq (Ms/Mo) \leq 6.53$. By setting (Ms/Mo) to a predetermined value or more, i.e., by setting the content Mo of the oxide solid electrolyte material 42o to the minimum content, it is possible to reduce the resistance in the negative electrode mixture layer 42 and further improve high-rate cycle characteristics. By setting (Ms/Mo) to a predetermined value or less, it is possible to inhibit the generation and growth of copper sulfide at a higher level.

In the present embodiment, in the thickness direction X, the ratio of presence of the sulfide solid electrolyte material 42s is gradually increased from the surface of the negative electrode current collector 41 toward the surface of the negative electrode mixture layer 42. On the other hand, in the thickness direction X, the ratio of presence of the oxide solid electrolyte material 42o is gradually reduced from the surface of the negative electrode current collector 41 toward the surface of the negative electrode mixture layer 42. Herein, it is assumed that the negative electrode mixture layer 42 is virtually divided into two portions (e.g., halved) in the thickness direction X, then one portion on the side of the negative electrode mixture layer 42 that is relatively close to the negative electrode current collector 41 is taken as a lower layer portion A1, and the other portion on the surface side thereof that is relatively far from the negative electrode current collector 41 is taken as an upper layer portion A2. At this point, the upper layer portion A2 that is far from the negative electrode current collector 41 contains a larger amount of the sulfide solid electrolyte material 42s than the lower layer portion A1. In other words, the sulfide solid electrolyte material 42s is unevenly distributed to the side of the upper layer portion A2. Meanwhile, the lower layer portion A1 that is close to the negative electrode current collector 41 contains a larger amount of the oxide solid electrolyte material 42o than t the upper layer portion A2. In other words, the oxide solid electrolyte material 42o is unevenly distributed to the side of the lower layer portion A1.

The lower layer portion A1 may or may not contain the sulfide solid electrolyte material 42s. In the lower layer portion A1, the content Mo of the oxide solid electrolyte material 42o is preferably higher than the content Ms of the sulfide solid electrolyte material 42s. In addition, the upper layer portion A2 may or may not contain the oxide solid electrolyte material 42o. In the upper layer portion A2, the content Ms of the sulfide solid electrolyte material 42s is preferably higher than the content Mo of the oxide solid electrolyte material 42o. Thus, by increasing the content of the oxide solid electrolyte material 42o in the lower layer portion A1 close to the negative electrode current collector 41, and increasing the content of the sulfide solid electrolyte material 42s in the upper layer portion A2 far from the negative electrode current collector 41, it is possible to appropriately exercise the effect of the technique disclosed herein.

Note that the distribution of each of the solid electrolyte materials 42s and 42o in the thickness direction X of the negative electrode mixture layer 42 can be determined, e.g., in the following manner. That is, first, focused ion beam (FIB) is performed on the negative electrode mixture layer 42, and the cross section of the negative electrode mixture layer 42 is exposed. Next, line analysis is performed on the entire cross section of the negative electrode mixture layer 42 in the thickness direction by using X-ray photoelectron spectroscopy (XPS). Target elements to be analyzed are the constituent element (e.g., P or S) of the sulfide solid electrolyte material 42s and the constituent element (e.g., La or Zr) of the oxide solid electrolyte material 42o. The line analysis is preferably performed at a plurality of freely-selected positions, e.g., at 5 or more positions. Subsequently, the target element to be analyzed is quantified for each line, and the content (mass) in the lower layer portion A1 and the content (mass) in the upper layer portion A2 are determined. Then, by calculating arithmetic mean of results at the plurality of positions, it is possible to determine the average mass distribution of each of the solid electrolyte materials 42s and 42o in the thickness direction X.

Note that the negative electrode mixture layer 42 having the single-layer structure can be fabricated by a manufacturing method including, e.g., the followings Steps S1 to S3. That is, first, negative electrode slurry containing the negative electrode active material 42a, the sulfide solid electrolyte material 42s, and the oxide solid electrolyte material 42o is prepared (Step S1). The preparation of the negative electrode slurry can be performed by using conventionally known kneading devices such as, e.g., a planetary mixer and a disperser. In an aspect, the average particle diameter Ds of the sulfide solid electrolyte material 42s and the average particle diameter Do of the oxide solid electrolyte material 42o preferably fall within the ranges described above. In addition, the ratio of (Do/Ds) preferably falls within the range described above. In another aspect, the content Mo of the oxide solid electrolyte material 42o and the content Ms of the sulfide solid electrolyte material 42s preferably fall within the ranges described above. In addition, the ratio of (Ms/Mo) preferably falls within the range described above.

Next, the negative electrode slurry is coated on the surface of the negative electrode current collector 41 (Step 2). The coating of the negative electrode slurry can be performed by using conventionally known coating devices such as a die coater, a slit coater, and a comma coater. Next, the negative electrode slurry coated on the surface of the negative electrode current collector 41 is dried (Step S3). The drying of the negative electrode slurry can be performed by performing one of operations such as heating, decompression, and air blowing or combining the operations and performing them using drying devices such as, e.g., a heating and drying device, a vacuum dryer, and dry air. The heating may be performed typically at a temperature of 200° C. or less, e.g., at a temperature of 80 to 150° C. At this point, when the average particle diameter Ds of the sulfide solid electrolyte material 42s is different from the average particle diameter Do of the oxide solid electrolyte material 42o, the oxide solid electrolyte material 42o having a relatively larger particle diameter settles first, and is unevenly distributed in the vicinity of the negative electrode current collector 41. On the other hand, the sulfide solid electrolyte material 42s having a relatively small particle diameter is caused to float up by convection during drying, and is unevenly distributed to the surface portion of the negative electrode mixture layer 42. Consequently, according to the manufacturing method including Steps S1 to S3, it is possible to properly fabricate the negative electrode mixture layer 42 having the single-layer structure in which the oxide solid electrolyte material 42o is unevenly distributed to the lower layer portion A1 and the sulfide solid electrolyte material 42s is unevenly distributed to the upper layer portion A2.

The sulfide solid electrolyte layer 6 is disposed between the positive electrode mixture layer 22 and the negative electrode mixture layer 42, and the positive electrode 2 and the negative electrode 4 are insulated from each other by the sulfide solid electrolyte layer 6. The sulfide solid electrolyte layer 6 is an insulating layer. The sulfide solid electrolyte layer 6 has ion conductivity. For example, in the case where the sulfide solid-state battery 1 is a lithium ion secondary battery, the sulfide solid electrolyte layer 6 has Li ion conductivity. In the thickness direction X, typically, the thickness of the sulfide solid electrolyte layer 6 is smaller than the thickness of each of the positive electrode mixture layer 22 and the negative electrode mixture layer 42. The sulfide solid electrolyte layer 6 is solid at room temperature (25° C.). The sulfide solid electrolyte layer 6 contains at least the sulfide solid electrolyte material. Although not particularly limited, an example of the sulfide solid electrolyte material includes the sulfide solid electrolyte material 42s described as the constituent material of the negative electrode mixture layer 42. The sulfide solid electrolyte layer 6 may or may not contain the solid electrolyte material other than the sulfide such as, e.g., the oxide solid electrolyte material, the nitride solid electrolyte material, or the halide solid electrolyte material that has, e.g., a content lower than that of the sulfide solid electrolyte material. The sulfide solid electrolyte layer 6 may contain only the sulfide solid electrolyte material as the solid electrolyte material.

In addition to the sulfide solid electrolyte material, the sulfide solid electrolyte layer 6 may contain ingredients other than the sulfide solid electrolyte material such as, e.g., the binder and various additives on an as needed basis. Examples of the binder include halogenated vinyl resins such as polyvinylidene fluoride (PVdF) and the copolymer of polyvinylidene fluoride and hexafluoropropylene (PVdF-HFP), and rubbers such as the acrylate-butadiene rubber (ABR), the styrene-butadiene rubber (SBR), and the acrylonitrile-butadiene rubber (NBR).

Thus, in the negative electrode mixture layer 42 of the sulfide solid-state battery 1, the oxide solid electrolyte material 42o is unevenly distributed to the lower layer portion A1, and the sulfide solid electrolyte material 42s is unevenly distributed to the upper layer portion A2. As a result, contact between the sulfide solid electrolyte material 42s and the negative electrode current collector 41 is reduced by the oxide solid electrolyte material 42o. Consequently, reaction between the Cu ingredient of the negative electrode current collector 41 and the S ingredient of the sulfide solid electrolyte material 42s is unlikely to occur. With this, it is possible to inhibit the generation and growth of copper sulfide to prevent a short circuit between the positive electrode 2 and the negative electrode 4. In addition, in the sulfide solid-state battery 1, the resistance in the negative electrode mixture layer 42 is reduced to a low level, and hence, e.g., even after high-rate charge and discharge are repeated, it is possible to maintain high battery capacity. Further, according to the technique disclosed herein, it is possible to omit the step of coating a conductive material on the surface of the negative electrode current collector 41. This is useful from the viewpoint of improving productivity and reducing manufacturing cost.

The sulfide solid-state battery 1 disclosed herein can be used for various purposes. For example, the sulfide solid-state battery 1 can be suitably used as a power source (driving power source) for a motor mounted on a vehicle. The type of the vehicle is not particularly limited and, examples of the vehicle typically include a plug-in hybrid vehicle (PHV), a hybrid vehicle (HV), and an electric vehicle (EV).

Figure 3:
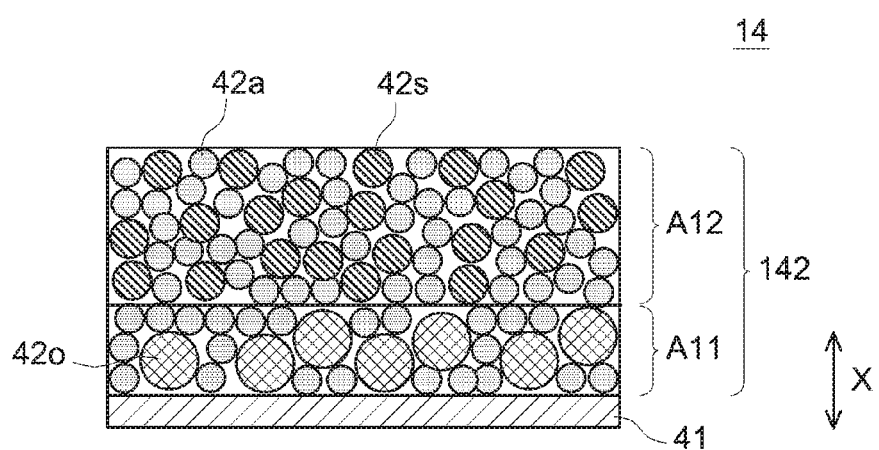
FIG. 3 is a partial cross-sectional view of the negative electrode according to another embodiment of the present invention.

Note that, in FIGS. 1 and 2, the negative electrode mixture layer 42 has the single-layer structure. However, the negative electrode mixture layer 42 may also have a multilayer structure having two or more layers. FIG. 3 is a partial cross-sectional view of a negative electrode 14 according to another embodiment. A negative electrode mixture layer 142 of the negative electrode 14 has the multilayer structure. The negative electrode mixture layer 142 has an interface at which constituents discontinuously (suddenly) change at some midpoint in the thickness direction X. The negative electrode mixture layer 142 includes a first layer A11 that is relatively close to the negative electrode current collector 41, and a second layer A12 that is relatively far from the negative electrode current collector 41 (on the surface side). In the thickness direction X, the thickness of the first layer A11 is typically smaller than that of the second layer A12.

The first layer A11 contains at least the negative electrode active material 42a and the oxide solid electrolyte material 42o. The first layer A11 may further contain the sulfide solid electrolyte material 42s that is, e.g., smaller in amount than the oxide solid electrolyte material 42o. The second layer A12 contains at least the negative electrode active material 42a and the sulfide solid electrolyte material 42s. The second layer A12 may further contain the oxide solid electrolyte material 42o that is, e.g., smaller in amount than the sulfide solid electrolyte material 42s. Each of the first layer A11 and the second layer A12 may contain, on an as needed basis, ingredients other than those mentioned above such as, e.g., the binder, the conductive material, the inorganic filler, and various additives described as the constituent materials of the negative electrode mixture layer 42. The negative electrode mixture layer 142 can be fabricated by a manufacturing method including, e.g., a first layer coating step of coating first layer slurry containing at least the negative electrode active material 42a and the oxide solid electrolyte material 42o, and a second layer coating step of coating second layer slurry containing at least the negative electrode active material 42a and the sulfide solid electrolyte material 42s.

Hereinbelow, several examples related to the present invention will be described, but the description is not intended to limit the present invention to such specific examples.

Examples 1 to 7, Comparative Examples 1 to 3

Fabrication of Positive Electrode

First, in an inert gas, the lithium/nickel/cobalt/manganese-containing composite oxide serving as the positive electrode active material, $Li_6PS_5Br$ serving as the sulfide solid electrolyte material, the ABR serving as the binder, and the vapor deposition carbon fiber serving as the conductive material were mixed such that the mass ratio satisfied positive electrode active material:sulfide solid electrolyte material:binder:conductive material=84.7:13.4:0.6:1.3. Positive electrode slurry was prepared by adding a solvent to the mixture and kneading the mixture. The positive electrode slurry was coated on the surface of aluminum foil (positive electrode current collector) and air-dried, and was then heated at 120° C. and dried. With this, the positive electrode in which the positive electrode mixture layer was fixed onto the positive electrode current collector was fabricated.

Fabrication of Negative Electrode

First, in the inert gas, Si serving as the negative electrode active material, $Li_6PS_5Br$ serving as the sulfide solid electrolyte material (SSE), $Li_7La_3Zr_2O_{12}$ serving as the oxide solid electrolyte material (OSE), the ABR serving as the binder, and the vapor deposition carbon fiber serving as the conductive material were mixed such that the mass ratio shown in Table 1 was satisfied. Negative electrode slurry was prepared by adding the solvent to the mixture and kneading the mixture. The negative electrode slurry was coated on the surface of Cu foil (negative electrode current collector) and air-dried, and was then heated at 120° C. and dried. With this, the negative electrode in which the negative electrode mixture layer having the single-layer structure was fixed onto the negative electrode current collector was fabricated.

Formation of Sulfide Solid Electrolyte Layer

Next, in an inert gas atmosphere. $Li_6PS_5Br$ serving as the sulfide solid electrolyte material and the ABR serving as the binder were mixed such that the mass ratio satisfied sulfide solid electrolyte material:binder=99.4:0.6. Solid electrolyte slurry was prepared by adding the solvent to the mixture and kneading the mixture. The solid electrolyte slurry was coated on the surface of the negative electrode mixture layer and air-dried, and was then heated at 120° C. and dried.

Construction of Sulfide Solid-State Battery

The fabricated positive electrode and the negative electrode having the sulfide solid electrolyte layer were stacked on each other such that the sulfide solid electrolyte layer was sandwiched therebetween, and were pressed in the stacking direction at 25° C. at a surface pressure of 1 ton/cm². Subsequently, by performing heat treatment at 350° C. for 5 hours, the sulfide solid-state battery (each of Examples 1 to 7 and Comparative Examples 1 to 3) including the positive electrode, the sulfide solid electrolyte layer, and the negative electrode in this order was constructed.

Example 8

Similarly to Example 2 except that the fabrication of the negative electrode was performed in the following manner, the sulfide solid-state battery (Example 8) was constructed. That is, first, in the inert gas, Si serving as the negative electrode active material, $LiTLa_3Zr_2O_{12}$ serving as the oxide solid electrolyte material (OSE), the ABR serving as the binder, and Ni powder serving as the inorganic filler were mixed. First layer slurry was prepared by adding the solvent to the mixture and kneading the mixture. The first layer slurry was coated on the surface of the Cu foil (negative electrode current collector) and air-dried, and was then heated at 120° C. and dried. With this, the first layer containing the oxide solid electrolyte material was formed on the negative electrode current collector. Next, in the inert gas, Si serving as the negative electrode active material, $Li_6PS_5Br$ serving as the sulfide solid electrolyte material (SSE), the ABR serving as the binder, and the vapor deposition carbon fiber serving as the conductive material were mixed. Second layer slurry was prepared by adding the solvent to the mixture and kneading the mixture. The second layer slurry was coated on the surface of the first layer and air-dried, and was then heated at 120° C. and dried. With this, the second layer, which contained the sulfide solid electrolyte material and had a thickness larger than that of the first layer, was formed on the first layer. Thus, the negative electrode in which the negative electrode mixture layer having a two-layer structure was fixed onto the negative electrode current collector was fabricated. Note that the mass ratio in the entire negative electrode mixture layer was as shown in Table 1.

Evaluation of Distribution of Solid Electrolyte Material

By using the XPS, the distribution of the solid electrolyte material in the thickness direction of the negative electrode mixture layer was measured. Specifically, the negative electrode mixture layer was halved in the thickness direction, and the average content (mass ratio) of each of the sulfide solid electrolyte material and the oxide solid electrolyte material was determined in each of the lower layer portion that was relatively close to the negative electrode current collector and the upper layer portion that was relatively far from the negative electrode current collector. As a result, in each of Examples 1 to 8, the amount of the sulfide solid electrolyte material contained in the upper layer portion was larger than that of the sulfide solid electrolyte material contained in the lower layer portion, and the amount of the oxide solid electrolyte material contained in the lower layer portion was larger than that of the oxide solid electrolyte material contained in the upper layer portion. In addition, in Example 8, at the position of the interface between the first layer and the second layer, the magnitude relationship between the content of the sulfide solid electrolyte material and the content of the oxide solid electrolyte material was reversed. In Comparative Example 1, the sulfide solid electrolyte material was contained substantially evenly over the entire negative electrode mixture layer. In Comparative Example 2, the oxide solid electrolyte material was contained substantially evenly over the entire negative electrode mixture layer. In Comparative Example 3, the sulfide solid electrolyte material and the oxide solid electrolyte material were contained substantially evenly over the entire negative electrode mixture layer.

Evaluation of High-Rate Cycle Characteristics

At 25° C., a high-rate charge-discharge test of a total of 300 cycles was performed on each of the constructed sulfide solid-state batteries (Examples 1 to 8, Comparative Examples 1 to 3) in a voltage range that allowed a state of charge (SOC) of 15 to 85%. At this point, each of charge and discharge was performed according to a constant current method at a charge-discharge rate of 2C. Note that "1C" means a current value that allows charge of a battery capacity (Ah) predicted from the theoretical capacity of the positive electrode active material in 1 hour. A capacity maintenance rate (%) was calculated by dividing a constant current discharge capacity at the 300th cycle by a constant current discharge capacity at the first cycle. The result is shown in Table 1.

Evaluation of Short Circuit Resistance During High-Temperature Preservation

First, at 25° C., each of the constructed sulfide solid-state batteries (Examples 1 to 8, Comparative Examples 1 to 3) was subjected to charge and discharge of a total of 50 cycles. Each cycle included the following (1) to (4): (1) CCCV discharge: after constant current discharge was performed at a rate of 0.3C until battery voltage reached 1.5 V, constant voltage discharge was performed until current reached 0.1C; (2) interruption; (3) CC charge: constant current charge was performed at a rate of 0.3C until the battery voltage reached 3.5 V; (4) interruption. Next, the sulfide solid-state battery having been subjected to the charge discharge cycle was charged by the CC charge at a rate of 0.01C until the battery voltage reached 4.2 V (fully charged state), and was preserved in a constant temperature bath having a temperature of 60° C. for 48 hours. Subsequently, the presence or absence of the short circuit was evaluated. The result is shown in Table 1. Note that, in Table 1, the case where the preservation is started at 60° C. and a voltage change amount from when 24 hours have elapsed to when 48 hours have elapsed is not less than 0.2 V is indicated by "PRESENCE" and the case where the voltage change amount is less than 0.2 V is indicated by "ABSENCE".

TABLE 1

| | | Example 1 | Example 2 | Example 3 | Example 4 | Example 5 | Example 6 |
|---|---|---|---|---|---|---|---|
| ADDITION AMOUNT (WT %) | NEGATIVE ELECTRODE ACTIVE MATERIAL | 55.5 | 54.5 | 54.5 | 54.5 | 54.5 | 54.5 |

TABLE 1-continued

|  |  |  |  |  |  |  |  |
|---|---|---|---|---|---|---|---|
|  | SSE (Ms) | 39.2 | 36.2 | 33.1 | 30.1 | 39.2 | 39.2 |
|  | OSE (Mo) | 6 | 12 | 18 | 24 | 6 | 6 |
|  | CONDUCTIVE MATERIAL | 2.2 | 2.2 | 2.2 | 2.2 | 2.2 | 2.2 |
|  | BINDER | 1.1 | 1.1 | 1.1 | 1.1 | 1.1 | 1.1 |
| AVERAGE PARTICLE DIAMETER (μm) | SSE (Rs) | 0.5 | 0.5 | 0.5 | 0.5 | 0.5 | 0.5 |
|  | OSE (Ro) | 1 | 1 | 1 | 1 | 1 | 1.5 |
|  | Ms/Mo | 6.53 | 3.02 | 1.84 | 1.25 | 6.53 | 6.53 |
|  | Do/Ds | 2 | 2 | 2 | 2 | 2 | 3 |
| PRESENCE OR ABSENCE OF SHORT CIRCUIT |  | ABSENCE | ABSENCE | ABSENCE | ABSENCE | ABSENCE | ABSENCE |
| CAPACITY MAINTENANCE RATE (%) |  | 88 | 85 | 82 | 60 | 88 | 86 |

|  |  | Example 7 | Example 8* | Comparative Example 1 | Comparative Example 2 | Comparative Example 3 |
|---|---|---|---|---|---|---|
| ADDITION AMOUNT (WT %) | NEGATIVE ELECTRODE ACTIVE MATERIAL | 54.5 | 54.5 | 54.5 | 54.5 | 54.5 |
|  | SSE (Ms) | 39.2 | 36.2 | 42.3 | 0 | 36.2 |
|  | OSE (Mo) | 6 | 12 | 0 | 42.3 | 12 |
|  | CONDUCTIVE MATERIAL | 2.2 | 2.2 | 2.2 | 2.2 | 2.2 |
|  | BINDER | 1.1 | 1.1 | 1.1 | 1.1 | 1.1 |
| AVERAGE PARTICLE DIAMETER (μm) | SSE (Rs) | 0.5 | 0.5 | 0.5 | — | 0.5 |
|  | OSE (Ro) | 2 | 3 | — | 0.5 | 0.5 |
|  | Ms/Mo | 6.53 | 3.02 | — | — | 3.02 |
|  | Do/Ds | 4 | 6 | — | — | 1 |
| PRESENCE OR ABSENCE OF SHORT CIRCUIT |  | ABSENCE | ABSENCE | PRESENCE | ABSENCE | PRESENCE |
| CAPACITY MAINTENANCE RATE (%) |  | 84 | 65 | 90 | 50 | 89 |

*TWO-LAYER COATING

As shown in Table 1, in Comparative Example 1 in which the oxide solid electrolyte material was not contained in the negative electrode mixture layer, and in Comparative Example 3 in which the sulfide solid electrolyte material and the oxide solid electrolyte material were evenly distributed in the negative electrode mixture layer, the short circuit occurred during high-temperature preservation. This is because Cu eluted from the negative electrode current collector reacted with S of the sulfide solid electrolyte material, copper sulfide was thereby generated in the negative electrode mixture layer, and the copper sulfide grew to reach the positive electrode. On the other hand, in Comparative Example 2 in which the sulfide solid electrolyte material was not contained in the negative electrode mixture layer, short circuit resistance during high-temperature preservation was excellent, but the capacity maintenance rate after the high-rate cycle was low. This is because the oxide solid electrolyte material was unlikely to form the interface with the negative electrode active material as compared with the sulfide solid electrolyte material, and hence the interface resistance in the negative electrode mixture layer was increased.

On the other hand, in each of Examples 1 to 8 in which the oxide solid electrolyte material was unevenly distributed to the lower layer portion of the negative electrode mixture layer, and the sulfide solid electrolyte material was unevenly distributed to the upper layer portion of the negative electrode mixture layer, the short circuit resistance during high-temperature preservation was higher than that in each of Comparative Examples 1 and 3. This is because the contact between the sulfide solid electrolyte material and the negative electrode current collector was prevented by the oxide solid electrolyte material, and the generation and growth of copper sulfide were inhibited. In addition, in each of Examples 1 to 8, the capacity maintenance rate after the high-rate cycle was higher than that in Comparative Example 2. This is because, as compared with Comparative Example 2, the resistance of the negative electrode was reduced by an improvement in ion conductivity in the negative electrode mixture layer and an increase in adhesion between the negative electrode mixture layer and the negative electrode current collector. Such results denote the significance of the technique disclosed herein.

Figure 4:
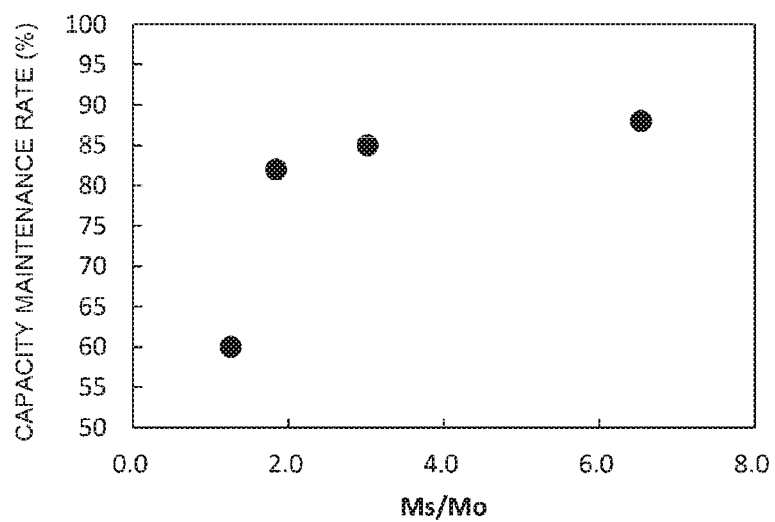
FIG. 4 is a graph showing a relationship between Ms/Mo and a capacity maintenance rate in each of Examples 1 to 4.

FIG. 4 is a graph showing a relationship between Ms/Mo and the capacity maintenance rate in each of Examples 1 to 4 in which the addition amount of the oxide solid electrolyte material was changed. When the results of Examples 1 to 4 were compared with each other, in each of Examples 1 to 3 in which the ratio (Ms/Mo) of the content Ms of the sulfide solid electrolyte material to the content Mo of the oxide solid electrolyte material was not less than 1.84, the capacity maintenance rate was particularly high. This is because the resistance of the negative electrode was reduced by the high content of the sulfide solid electrolyte material. Particularly in each of Examples 1 and 2 in which (Ms/Mo) was 3.02 to 6.53, the high capacity maintenance rate, which was not inferior to that in Comparative Example 1 in which the oxide solid electrolyte material was not contained in the negative electrolyte mixture layer, was implemented.

Figure 5:
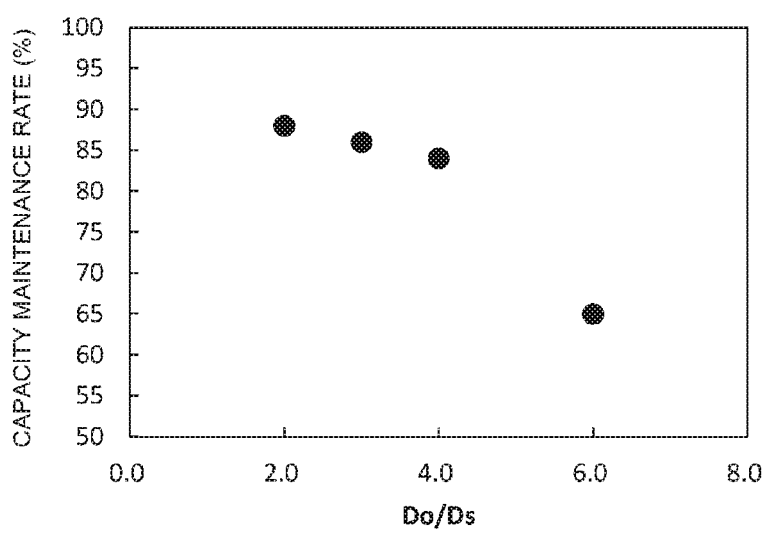
FIG. 5 is a graph showing a relationship between Do/Ds and the capacity maintenance rate in each of Examples 5 to 8.

FIG. 5 is a graph showing a relationship between Do/Ds and the capacity maintenance rate in each of Examples 5 to 8 in which the average particle diameter of the oxide solid electrolyte material was changed. When the results of Examples 5 to 8 were compared with each other, in each of Examples 5 to 7 in which the ratio (Do/Ds) of the average particle diameter Do of the oxide solid electrolyte material to the average particle diameter Ds of the sulfide solid electrolyte material was not more than 4, the capacity maintenance rate was particularly high. This is because settling of the oxide solid electrolyte material during heating and drying of the negative electrode slurry was facilitated by increasing the average particle diameter Do of the oxide solid electrolyte material. As a result, a larger amount of the oxide solid electrolyte material was disposed in the vicinity of the negative electrode current collector, and the effect of the technique disclosed herein was exercised at a high level. Particularly in each of Examples 5 and 6 in which (Do/Ds) was 2 to 3, the high capacity maintenance rate, which was not inferior to that in Comparative Example 1 in which the oxide solid electrolyte material was not contained in the negative electrode mixture layer, was implemented. In addition, in each of Examples 1 to 7 in which the negative electrode mixture layer having the single-layer structure was fabricated by performing the coating once, operation time was shorter and productivity was higher than those in Example 8 in which the negative electrode mixture layer having the two-layer structure was fabricated by performing the coating twice.

While the present invention has been described in detail, the above embodiments and examples are only illustrative, and the invention disclosed herein encompasses various modifications and changes to the specific examples described above.

The terms and expressions used herein are for description only and are not to be interpreted in a limited sense. These terms and expressions should be recognized as not excluding any equivalents to the elements shown and described herein and as allowing any modification encompassed in the scope of the claims. The preferred embodiments disclosed herein may be embodied in many various forms. This disclosure should be regarded as providing preferred embodiments of the principle of the invention. These preferred embodiments are provided with the understanding that they are not intended to limit the invention to the preferred embodiments described in the specification and/or shown in the drawings. The invention is not limited to the preferred embodiment described herein. The invention disclosed herein encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

What is claimed is:

1. A sulfide solid-state battery comprising:
    a negative electrode current collector that contains copper;
    a negative electrode mixture layer that contains a negative electrode active material, a sulfide solid electrolyte material, and an oxide solid electrolyte material and is disposed on the negative electrode current collector;
    a positive electrode mixture layer that contains a positive electrode active material; and
    a sulfide solid electrolyte layer that contains the sulfide solid electrolyte material and is disposed between the negative electrode mixture layer and the positive electrode mixture layer,
    wherein, assuming that the negative electrode mixture layer is virtually divided into two portions in a thickness direction, then a portion on a side of the negative electrode mixture layer relatively close to the negative electrode current collector is taken as a lower layer portion, and a portion on a surface side of the negative electrode mixture layer relatively far from the negative electrode current collector is taken as an upper layer portion:
        an amount of the sulfide solid electrolyte material contained in the upper layer portion is larger than an amount of the sulfide solid electrolyte material contained in the lower layer portion, and
        an amount of the oxide solid electrolyte material contained in the lower layer portion is larger than an amount of the oxide solid electrolyte material contained in the upper layer portion,
    wherein the sulfide solid-state battery has a ratio (Do/Ds) of an average particle diameter Do of the oxide solid electrolyte material to an average particle diameter Ds of the sulfide solid electrolyte material in the negative electrode mixture layer of from 2 to 4.

2. The sulfide solid-state battery according to claim 1, wherein
    the sulfide solid-state battery has a ratio (Ms/Mo) of a content Ms of the sulfide solid electrolyte material to a content Mo of the oxide solid electrolyte material in the negative electrode mixture layer of not less than 1.84.

3. The sulfide solid-state battery according to claim 2, wherein
    the sulfide solid-state battery has a ratio (Ms/Mo) of a content Ms of the sulfide solid electrolyte material to a content Mo of the oxide solid electrolyte material in the negative electrode mixture layer of not more than 6.53.

4. The sulfide solid-state battery according to claim 1, wherein
    the negative electrode mixture layer has a single-layer structure.

* * * * *